(12) United States Patent
Murata

(10) Patent No.: US 6,742,933 B2
(45) Date of Patent: Jun. 1, 2004

(54) BEARING AND METHOD OF ASSEMBLING THE BEARING

(75) Inventor: Shigenori Murata, Ann Arbor, MI (US)

(73) Assignee: NSK Corporation, Ann Arbor, MI (US)

(*) Notice: Subject to any disclaimer, the term of this patent is extended or adjusted under 35 U.S.C. 154(b) by 0 days.

(21) Appl. No.: 10/272,302

(22) Filed: Oct. 17, 2002

(65) Prior Publication Data
US 2004/0076354 A1 Apr. 22, 2004

(51) Int. Cl.$^7$ ................................ F16C 19/00
(52) U.S. Cl. .................. 384/512; 384/513; 384/516; 29/898.061
(58) Field of Search ................. 384/512, 513, 384/516, 510; 29/898.061

(56) References Cited

U.S. PATENT DOCUMENTS 5,863,136 A * 1/1999 Miyazaki .................. 384/512
6,050,728 A * 4/2000 Obara et al. ............... 384/547

* cited by examiner

Primary Examiner—Lenard A Footland
(74) Attorney, Agent, or Firm—Crowell & Moring LLP

(57) ABSTRACT

A bearing for use in a water pump or similar apparatus and a method of assembling the bearing. The bearing has a stepped shaft and a counterbored raceway at the fan or pulley end which allows for use of a larger number of balls in the raceway at the fan or pulley end, and which allows for using larger balls at the impeller end. The method of assembly of the bearing includes assembling balls and a cage to form a ball and cage assembly, assembling ball and cage assembly into the outer race at its pulley end, then sliding the shaft, impeller end first, into the outer race through the pulley end such that the first inner raceway and the first balls align with the first outer raceway. The shaft is then displaced in a direction perpendicular to its axial centerline within the outer race. A second plurality of balls is inserted onto the shaft within the outer race at its second outer raceway end, and a second cage is inserted over the shaft and within the outer race to surround the second plurality of balls.

20 Claims, 4 Drawing Sheets

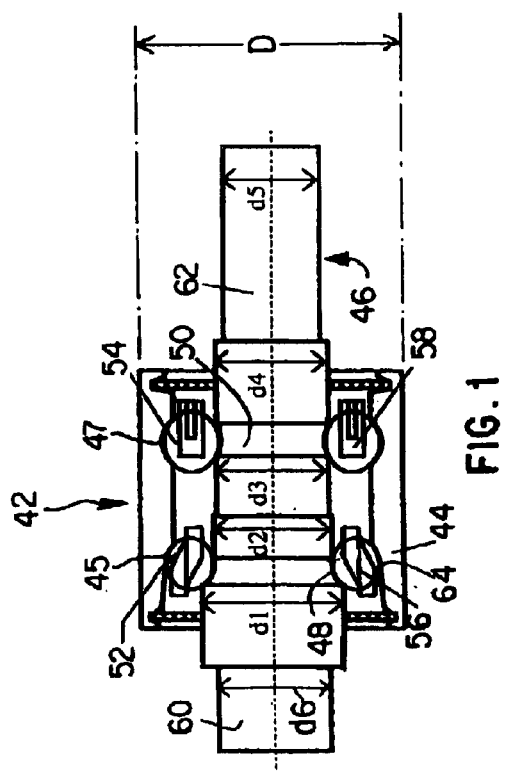
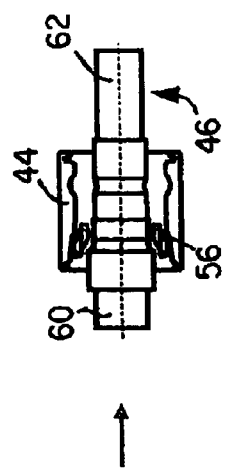
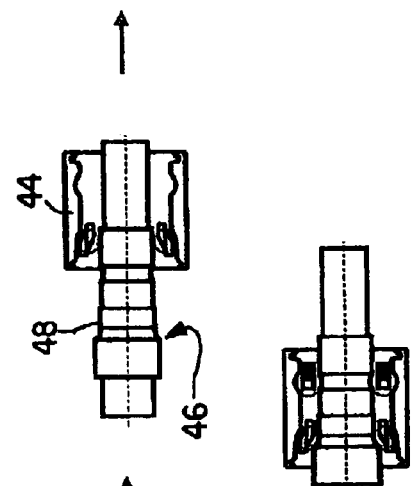
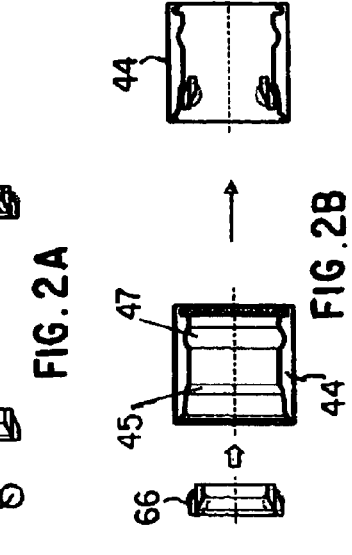
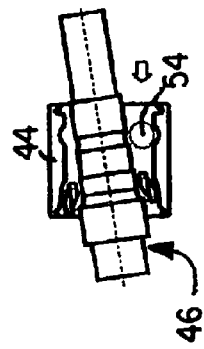

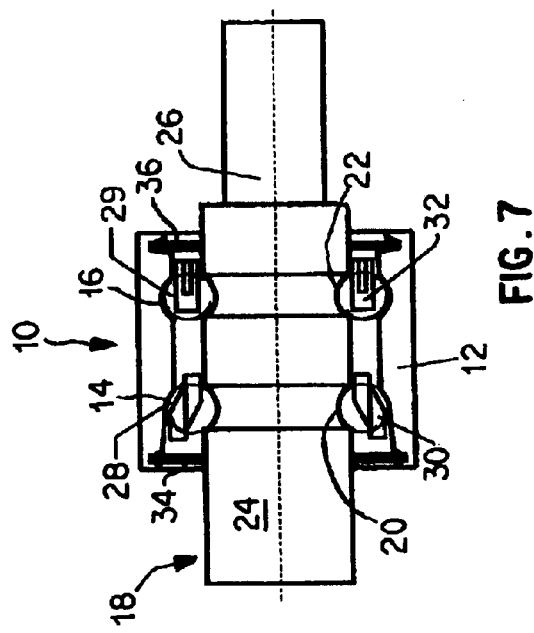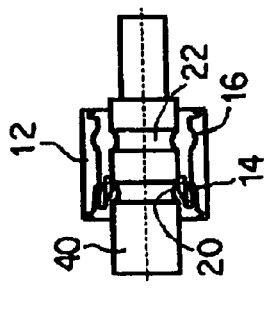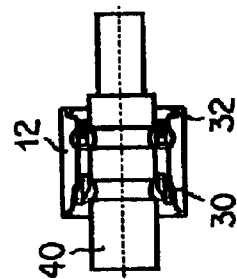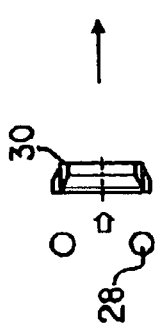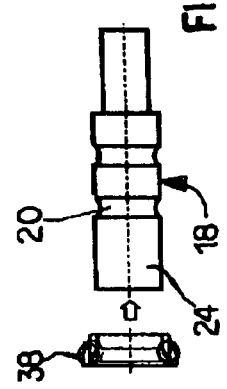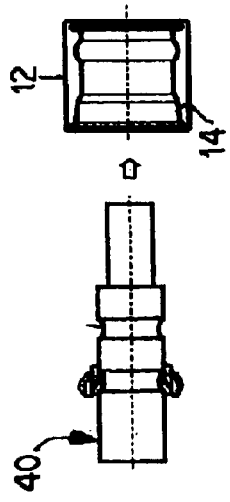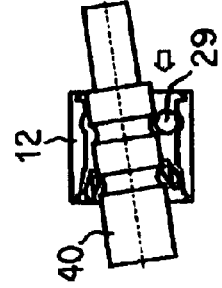

BEARING AND METHOD OF ASSEMBLING THE BEARING

BACKGROUND AND SUMMARY OF THE INVENTION

This invention relates to a bearing and a method of assembling the bearing and, more particularly, this invention relates to an integral shaft bearing (whose typical usage is for a water pump) and a method of assembling the bearing.

A typical water pump used for circulating coolant water for an automobile engine comprises a cylindrical housing with an installation flange on the side nearest the engine and fastened to the cylinder block of the engine by way of the installation flange. Provided on the radial inside of the housing is a rolling element bearing. A typical rolling element bearing is shown in FIG. 7. The typical rolling element bearing generally designated by the numeral 10 comprises a ring forming an outer race 12 having a pair of first and second outer raceways 14, 16, a rotating spindle or shaft 18 forming an inner race and having a pair of first and second inner raceways 20, 22 opposed to the first and second outer raceways 14, 16, respectively. A pulley (not shown) driven by a belt which, in turn, is driven by the crankshaft of the engine is mounted on one end of the shaft, as may be a fan, and an impeller (not shown) is mounted on the other end of the shaft 18. The end 24 of the shaft 18 on which the pulley is mounted has a larger diameter than the other end 26 of the shaft 18. A plurality of balls 28, 29 rides in each of the spaces defined by the first and second inner and outer raceways, respectively. Cages 30, 32 are used to maintain the spacing of the balls 28, 29. Seals 34, 36 may be provided between the ends of the ring 12 and the spindle 18 to prevent the grease filled inside the bearing 10 (when prelubricated with grease) from leaking out, as well as prevent foreign matter such as dirt or steam on the outside from getting inside the unit.

When the drive belt is mounted on the pulley which is fixed to the shaft and on a pulley fixed to the engine driveshaft, the belt is under tension, thereby creating an overhung, or moment, load on the pulley end of the shaft. This leads to various stresses which, in turn, lead to premature wear and shorter life of the bearing. U.S. Pat. No. 5,462,489 to Kan, et al., which is incorporated herein by reference in its entirety, teaches one such problem involving possible breakage of the shaft and its solution, but this patent does not address other stress-related problems.

U.S. Pat. No. 6,168,316 to Paling, et al., which is incorporated herein by reference in its entirety, teaches lengthening the life of the unit by using a full complement of balls in mutual contact, and no cage, in the raceways nearer the pulley end of the unit, with spaced-apart balls held in place by a cage in the raceways nearer the impeller end of the unit.

Japanese unexamined utility model application (Jitsukai) No. Sho 53-97701 to Koyo Seiko K. K., which is incorporated herein by reference in its entirety, teaches a bearing assembly which can use either balls or rollers in both raceways, or balls in the raceways at the pulley end of the shaft and rollers in the raceways at the impeller end of the shaft. The construction of JP 53-97701 uses a shaft having a smaller diameter at the pulley end and balls which are larger in diameter mounted in the raceways at the fan end, thereby reducing the stresses caused at the ball/raceway contact by the drive belt, but increasing the bending stresses within the shaft, causing a greater propensity for the problems outlined in the Kan, et al.

U.S. Pat. No. 6,231,242 to Yano, et al., which is incorporated herein by reference in its entirety, teaches a bearing wherein the pulley end of the shaft is larger in diameter than the impeller end, but has a counterbore portion in the outer raceway at the pulley end of the unit, thereby allowing for a full complement of balls in the raceways at that end, but spaced-apart balls in the raceways at the impeller end of the unit. Both sets of balls are the same size and both are held in place by cages. The diameter of the balls is 22–25% of the outside diameter of the outer race or 25–28% of the diameter of the outer raceway at the pulley end of the unit, i.e., the outer raceway which is counterbored.

Regardless of the measures taken to reduce stress, all the prior art bearings are subject to premature failure.

Japanese laid-open (Kokai) patent application No. 2000-314428, which is incorporated herein by reference in its entirety, teaches a method of assembling a prior art bearing. Referring to FIGS. 8A–8D, in assembling a ball bearing, the first plurality of balls 28 to be placed in the first inner raceway 20 at the pulley end of the unit 10 are first inserted into a first cage 30 to form a first balls-and-cage assembly 38. The first-balls-and cage assembly 38 is slid over the shaft 18 at its pulley end 24 until the balls seat in the first inner raceway 20. The thus-assembled shaft and first ball-and-cage Assembly 40 is then slid, impeller end first, into the outer race 12 through the pulley end of the outer race, until the balls seat in the first outer raceway 14 and the first inner raceway 20 and first outer raceway 14 are lined up. The impeller end of the shaft is then displaced in a direction perpendicular to its axial centerline within the outer race as shown in FIG. 8D. After that, the second plurality of balls 29 is inserted onto the shaft within the outer race at its second outer raceway end, and the second cage 32 is inserted over the shaft and within the outer race to surround the second plurality of balls.

The major disadvantage of the prior art method of assembly is the first set of balls and their cage had to be assembled onto the shaft before being inserted into the housing. This exposed the balls to possible damage and contamination It is, therefore, an object of the present invention to provide a bearing for an apparatus, such as a water pump, having a rotating shaft with a driving element such as a pulley at one end and a driven element such as an impeller at the other end which is free of the aforementioned and other such disadvantages.

It is another object of the present invention to provide a bearing for an apparatus having a rotating shaft with a driving element such as a pulley at one end and a driven element such as an impeller at the other end which reduces the maximum stress and is therefore less susceptible to failure at the end of the shaft opposite the driving element.

It is still another object of the present invention to provide an improved bearing for a water pump.

It is yet another object of the present invention to provide a method of assembling the inventive bearing which is easy and economical to practice.

These and other objects are accomplished by providing a bearing for a water pump or the like having a stepped shaft and a counterbored raceway at the fan or pulley end which allows for use of a larger number of balls in the raceway at the fan or pulley end, and which allows for using larger balls at the impeller end.

While the invention is described by reference to the preferred embodiment of use in a water pump, it is equally useful in any apparatus having an integral shaft driven at one end and driving a device at the other end. Non-limiting examples of such applications are supercharger driveshaft, fan support, idler, and various agricultural uses such as planter wheel, furrowing disk, seed meter, etc. In addition, the inventive bearing could be used in a dentist's drill or other small device application. The inventive bearing could also be used in an electric motor drive.

The inventive method of assembly of the bearing includes inserting the first ball and cage assembly into the outer race at its pulley end, then sliding the shaft, impeller end first, into the outer race through the pulley end such that the first inner raceway and the first balls align with the first outer raceway. The shaft is then displaced in a direction perpendicular to its axial centerline within the outer race. A second plurality of balls is inserted onto the shaft within the outer race at its second outer raceway end, and a second cage is inserted over the shaft and within the outer race to surround the second plurality of balls.

In its broadest aspect, the inventive bearing comprises:

A. an outer race having spaced-apart first and second outer raceways on its inner peripheral surface;

B. a rotating shaft forming an inner race having spaced-apart first and second inner raceways on its outer peripheral surface, said first and second inner raceways being opposed to said first and second outer raceways, respectively, and forming first and second ball-receiving spaces therebetween; and C. a first set of a first plurality of freely rolling first balls incorporated into said first ball-receiving space and a second set of a second plurality of freely rolling second balls incorporated into said second ball-receiving space;

D. said shaft having a first, proximal, end axially extending beyond said first raceway and adapted to be driven by a driving element and a second, distal, end axially extending beyond said second raceway and adapted to transmit rotation to a working element;

E. said shaft being stepped from a first diameter at the proximal side of said first raceway to a second diameter at the distal side of said first inner raceway;

F. said first outer raceway having a counterbore portion;

G. said first plurality of balls being larger than said second plurality of balls; and H. said second balls being larger in diameter than said first balls.

In a preferred embodiment, the driving element is a belt-driven pulley, although any equivalent construction for driving the apparatus, all of which are well-known in the art, such as a sprocket wheel, may be used.

In another preferred embodiment, the relationship among the first diameter of the shaft (denoted as d1 in FIG. 1), the second diameter (denoted as d2 in FIG. 1), and a diameter formed by the balls in said first inner raceway (denoted as b1 in FIG. 2c), is d1>b1>d2. An annular bead in the portion of the shaft denoted as having the diameter d2 which is slightly larger than b1 would be equivalent to d2 being smaller than b1.

In a more preferred embodiment, the shaft could be further stepped from the second diameter to a third diameter (d3), from the third diameter to a fourth diameter (d4) at the distal side of said second inner raceway, and from the fourth diameter to a fifth diameter (d5) at the distal end of said shaft, wherein $d1 > b1 \geq d2 \geq d3 \geq d4 \geq d5$.

Another aspect of the present invention is the method of assembling the bearing. The inventive method of assembling the bearing, comprises:

A. inserting said first plurality of balls into a first cage to form a first ball and cage assembly;

B. inserting said first ball and cage assembly into said outer race at its first outer raceway end;

C. sliding said shaft, distal end first, into said outer race through said first outer raceway end such that said first inner raceway and said first balls align with said first outer raceway;

D. displacing the distal end of said shaft in a direction perpendicular to its axial centerline within said outer race;

E. inserting said second plurality of balls onto said shaft within said outer race at its second outer raceway end; and F. inserting a second cage over said shaft and within said outer race to surround said second plurality of balls.

BRIEF DESCRIPTION OF THE DRAWINGS

These and other objects, features and advantages will become apparent from the following detailed description of presently preferred embodiments when taken in conjunction with the accompanying drawings wherein:

FIG. 1 is a schematic side view of a bearing constructed according to this invention;

FIG. 2 is a schematic illustration of the steps in assembling the bearing of FIG. 1;

FIG. 7 is a schematic side view of a prior art bearing; and

FIG. 8 schematically illustrates the prior art steps for assembling a bearing.

DESCRIPTION OF THE PREFERRED EMBODIMENTS

Figure 3:
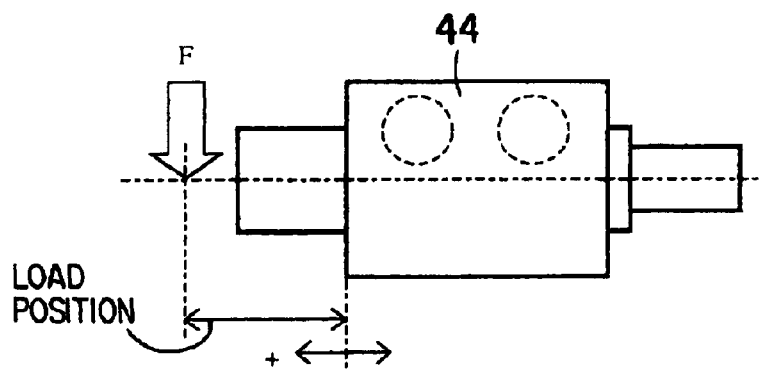
FIG. 3 is a side view showing the assumed loading of a bearing used for calculation purposes, explaining the definition of load position for the graphs of FIGS. 4, 5, and 6.

Referring to FIG. 1, the bearing of the present invention, generally designated by the numeral 42, comprises an outer ring forming an outer race 44 having a first outer raceway 45 and a second outer raceway 47, a shaft or spindle forming an inner race 46 having a first inner raceway 48 and a second inner raceway 50 opposed to the first and second outer raceways 45 and 47, respectively to form first and second spaces for receiving first and second pluralities of balls 52 and 54, respectively, the first and second pluralities of balls 52, 54 being held in place by first and second cages 56 and 58, respectively. The shaft 46 has a first end 60 to which is fixed a pulley (not shown) for driving the water pump. Typically, the pulley is driven by a belt which is, in turn, driven by a pulley attached to one end of the engine crankshaft. Some water pumps and an apparatus other than a water pump would be similarly driven by a belt and pulley or by an equivalent driving arrangement such as a sprocket wheel and chain. For ease in describing the instant invention, the first end 60 of the shaft 46 is designated as the proximal end. The other, second, end 62 of the shaft 46 drives an impeller (not shown) of a water pump or some other driven device in an apparatus other than a water pump. For ease in describing the instant invention, the second end 62 of the shaft 46 is designated as the distal end.

The shaft 46 is stepped down in diameter from the proximal end 60 to the distal end 62. In the most preferred embodiment of the instant invention, it is stepped down from a first diameter d1 to a second diameter d2 to a third diameter d3 to a fourth diameter d4 to a fifth diameter d5, although, in its broadest aspect, the invention contemplates at least one step down, from d1 to d2, that is, from the proximal side of the first inner raceway 48 to the distal side of the first inner raceway 48. The ball complement of the first inner raceway 48 has a diameter designated as b1 (see FIG. 2C). Thus, the relationship of the diameters d1, d2, and b1 is d1>b1≧d2. Considering the optional, but preferred, additional steps in the shaft 46, the relationships are d1>b1≧d2≧d3≧d4≧d5. It is to be distinctly understood that while the diameter of the shaft at the proximal end 60, denoted as d6, is shown as being smaller than d1, that is for illustrative clarity and is not to be limiting. Thus, d6 could be larger, smaller, or the same size as d1.

The first outer raceway 45 has a counterbore portion 64. The first plurality of balls 52 is larger than the second plurality of balls 54, that is, there are more balls riding in the space formed by the first inner and outer raceways 48 and 45 than in the space formed by the second inner and outer raceways 50 and 47. At the same time the second balls 54 are larger in diameter than the first balls 52.

Attention is now directed to FIG. 2 where the assembly method of the present invention is shown. In the first step, the first plurality of balls 52 are inserted into the first cage 56 to form the first ball and cage assembly 66. The first ball and cage assembly 66 is inserted into the outer race 44 at its pulley end until it seats in the first outer raceway 45. The shaft 46 is then slid into the outer race 44, impeller end 62 first, through the pulley end of the outer race such that the first inner raceway 48 aligns with the first balls 52 and the first outer raceway 45. It is pointed out that the terms "impeller end" and "pulley end" are used for convenience in a non-limiting sense because the assembly of a bearing for a water pump is being described. Obviously, for a different apparatus, terms descriptive of the elements in question might be used.

The impeller end 62 of the shaft 46 is then displaced in a direction perpendicular to its axial centerline within the outer race as shown in FIG. 2D. After that, the second plurality of balls 54 is inserted onto the shaft within the outer race at its second outer raceway end, and the second cage 58 is inserted over the shaft and within the outer race to surround the second plurality of balls.

A series of calculations was run comparing the load carrying capacity in Newtons of different size bearings according to the instant invention with prior art bearings. The calculations were performed according to industry standards, which are ABMA (American Bearing Manufacturers Association) standards. Specifically, the ABMA dynamic capacity calculation is performed per the ANSI/ABMA standard No. 9-1990 (R2000) which is titled "Load Ratings and Fatigue Life for Ball Bearings" written in 1990 and revised in 2000. The calculations shown in the table and graphs for load carrying capacity and life are based on bearings of identical materials, with any differences the result only of geometry differences between the instant invention and prior art.

In the table, the 30 Series designates a bearing with an outside diameter ("D" as shown in FIG. 1) of 30 mm, the 35 series designates a bearing with an outside diameter of 35 mm, and the 38.1 series designates a bearing with an outside diameter of 38.1 mm. A1, A3, and A5 are prior art bearings with the same number and size of balls at the hub end and the impeller end of the bearing. A2, A4, and A6 are bearings according to the aforementioned U.S. Pat. No. 6,231,242, using balls of the same size at the hub end and the impeller end, but more balls at the hub end. B1, B2, and B3 are bearings according to the instant invention with more balls at the hub end and larger balls at the impeller end. The results are shown in Table 1.

TABLE 1

| Type | | 30 Series | | | 35 Series | | | 38.1 Series | | |
|---|---|---|---|---|---|---|---|---|---|---|
| | | A1 | A2 | B1 | A3 | A4 | B2 | A5 | A6 | B3 |
| Cr (N) | Hub | 6600 | 7700 | 7700 | 8150 | 11200 | 11200 | 9800 | 13300 | 13300 |
| | Impeller | 6600 | 5600 | 5950 | 8150 | 8200 | 8900 | 9800 | 9700 | 10700 |
| Size (mm)/Number of Balls | Hub | 6.35/6 | 6.35/8 | 6.35/8 | 7.144/6 | 7.938/8 | 7.938/8 | 7.938/6 | 8.731/8 | 8.731/8 |
| | Impeller | 6.35/6 | 6.35/5 | 6.747/5 | 7.144/6 | 7.938/5 | 8.731/5 | 7.938/6 | 8.731/5 | 9.525/5 |

As will be seen, the load carrying capacity at the hub end of the 30 series bearing according to the instant invention is the same as that of the U.S. Pat. No. 6,231,242 patent while the load carrying capacity at the impeller end is substantially improved over that of the bearing of the U.S. Pat. No. 6,231,242 patent. In the case of the 35 and 38.1 series, the load carrying capacity at the hub end of the bearing according to the instant invention is the same as that of the U.S. Pat. No. 6,231,242 patent while the load carrying capacity at the impeller end is substantially improved over that of both the bearing of the U.S. Pat. No. 6,231,242 patent and the other prior art bearing.

Figure 4:
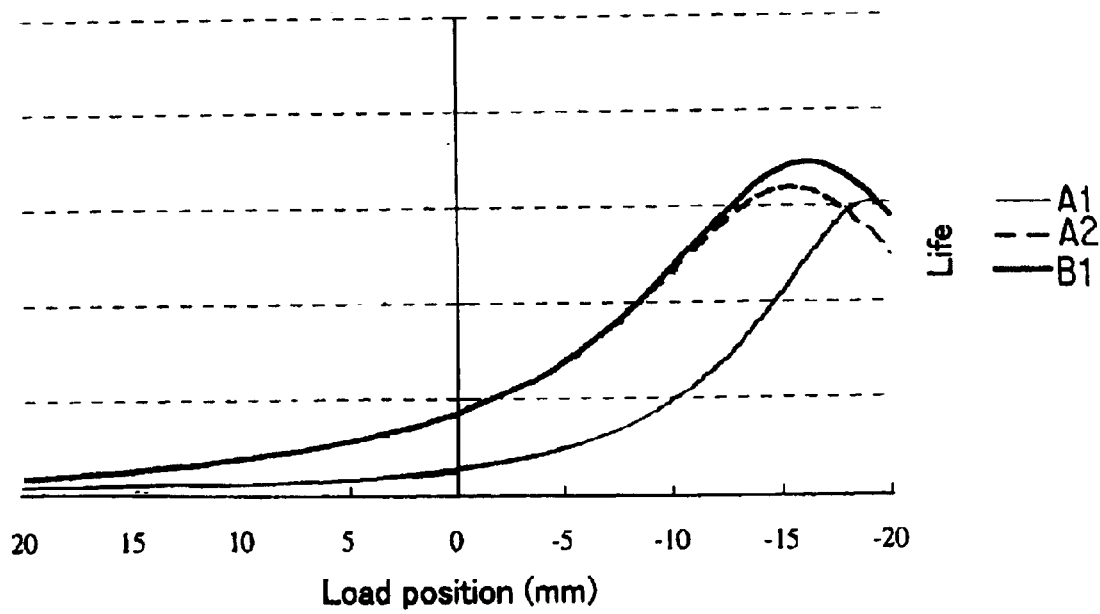
FIG. 4 is a graph showing the results of the life calculations of the 30 series bearing.
Figure 5:
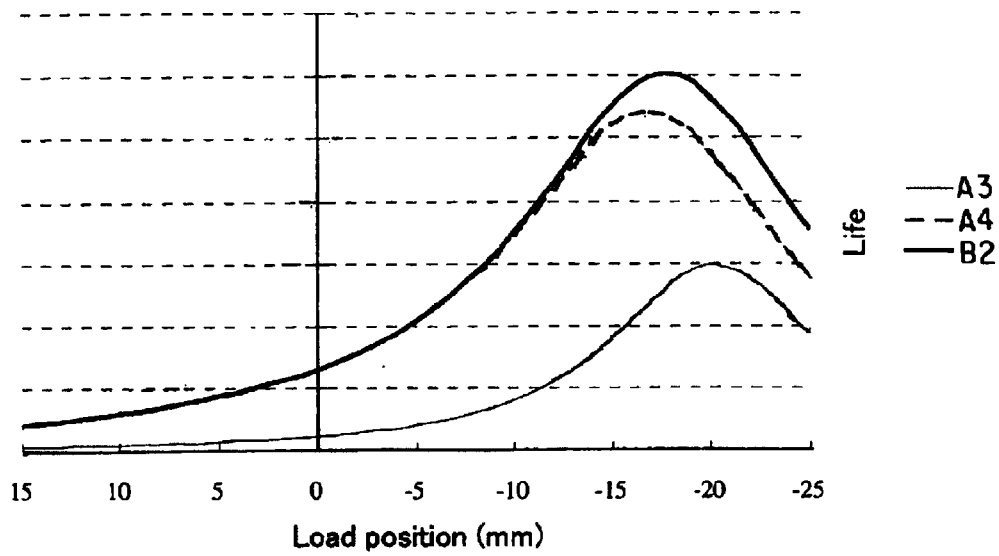
FIG. 5 is a graph showing the results of the life calculations of the 35 series bearing.
Figure 6:
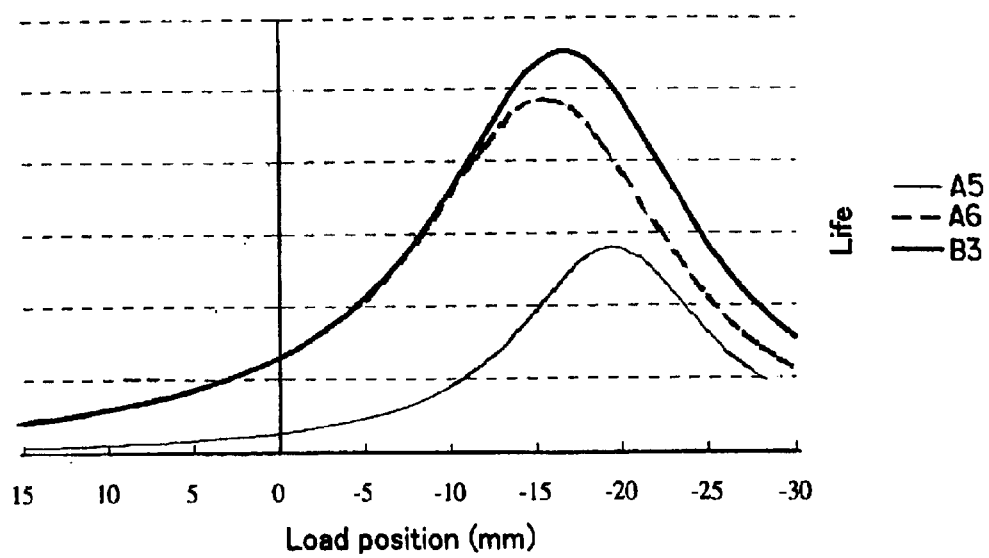
FIG. 6 is a graph showing the results of the life calculations of the 38 series bearing.

A comparison of bearing life of bearings A1, A2, and B1; A3, A4, and B2; and A5, A6, and B3 was calculated based on the load carrying capacities. In these calculations, a load F was assumed to be applied by a belt to the pulley end of the shaft at varying positions from the end of the outer race 44 (see FIG. 3). The results are shown in FIGS. 4, 5, and 6, respectively for the 30, 35, and 38.1 series bearings. In each case, the bearing of the instant invention showed a longer life.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bearing comprising:

A. an outer race having spaced-apart first and second outer raceways on its inner peripheral surface;

B. a rotating shaft forming an inner race having spaced-apart first and second inner raceways on its outer peripheral surface, said first and second inner raceways being opposed to said first and second outer raceways, respectively, and forming first and second ball-receiving spaces therebetween; and C. a first set of a first plurality of freely rolling first balls incorporated into said first ball-receiving space and a second set of a second plurality of freely rolling second balls incorporated into said second ball-receiving space;

D. said shaft having a first, proximal, end axially extending beyond said first raceway and adapted to be driven by a driving element and a second, distal, end axially extending beyond said second raceway and adapted to transmit rotation to a working element;

E. said shaft being stepped from a first diameter at the proximal side of said first inner raceway to a second diameter at the distal side of said first inner raceway;

F. said first outer raceway having a counterbore portion;

G. said first plurality of balls being larger than said second plurality of balls; and H. said second balls being larger in diameter than said first balls.

2. A bearing for a water pump as defined in claim 1.

3. A bearing as defined in claim 1, wherein said driving element is a pulley.

4. A bearing as defined in claim 3, wherein said pulley is driven by a belt.

5. A bearing as defined in claim 1, wherein said driving element is a sprocket wheel.

6. A bearing as defined in claim 5, wherein said sprocket wheel is driven by a chain.

7. A bearing as defined in claim 1, wherein said working element is an impeller.

8. A bearing as defined in claim 1, wherein said first diameter is denoted as d1, said second diameter is denoted as d2, a diameter formed by the balls of said first inner raceway is denoted as b1, and wherein d1>b1>d2.

9. A bearing as defined in claim 8, wherein said shaft is optionally further stepped from said second diameter to a third diameter (d3), from said third diameter to a fourth diameter (d4) at the distal side of said second inner raceway, and from said fourth diameter to a fifth diameter (d5) at the distal end of said shaft, wherein d1>b1≧d2≧d3≧d4≧d5.

10. A bearing as defined in claim 1, further comprising a first cage retaining said first balls in said first space and a second cage retaining said second balls in said second space.

11. A method of assembling the bearing of claim 1, comprising:

A. inserting said first plurality of balls into a first cage to form a first ball and cage assembly;

B. inserting said first ball and cage assembly into said outer race at its first outer raceway end;

C. sliding said shaft, distal end first, into said outer race through said first outer raceway end such that said first inner raceway and said first balls align with said first outer raceway;

D. displacing the distal end of said shaft in a direction perpendicular to its axial centerline within said outer race;

E. inserting said second plurality of balls onto said shaft within said outer race at its second outer raceway end; and F. inserting a second cage over said shaft and within said outer race to surround said second plurality of balls.

12. A method as defined in claim 11, wherein said bearing is for a water pump.

13. A method as defined in claim 11, wherein said driving element is a pulley.

14. A method as defined in claim 13, wherein said pulley is driven by a belt.

15. A method as defined in claim 11, wherein said driving element is a sprocket wheel.

16. A method as defined in claim 15, wherein said sprocket wheel is driven by a chain.

17. A method as defined in claim 11, wherein said working element is an impeller.

18. A method as defined in claim 11, wherein said first diameter is denoted as d1, said second diameter is denoted as d2, a diameter formed by the balls of said first inner raceway is denoted as b1, and wherein d1>b1>d2.

19. A method as defined in claim 18, wherein said shaft is optionally further stepped from said second diameter to a third diameter (d3), from said third diameter to a fourth diameter (d4) at the distal side of said second inner raceway, and from said fourth diameter to a fifth diameter (d5) at the distal end of said shaft, wherein d1>b1>d2>d3≧d4≧d5.

20. A method as defined in claim 11, wherein said bearing further comprises a first cage retaining said first balls in said first space and a second cage retaining said second balls in said second space.

* * * * *